United States Patent
Schmidt et al.

(10) Patent No.: US 7,121,073 B2
(45) Date of Patent: *Oct. 17, 2006

(54) CUTTING REEL ADJUSTING SYSTEM

(75) Inventors: Mark Alvin Schmidt, Charlotte, NC (US); Eric Alan Poulson, Paradise, UT (US); Donald Lewis Cripps, Smithfield, UT (US); Ronald Lee Reichen, Raleigh, NC (US); Richard David Thier, Juneau, WI (US); John Michael Flenniken, Rock Hill, SC (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/427,720

(22) Filed: Apr. 30, 2003

(65) Prior Publication Data

US 2004/0216436 A1 Nov. 4, 2004

(51) Int. Cl.
*A01D 34/42* (2006.01)
(52) U.S. Cl. .......................... 56/249; 56/10.4
(58) Field of Classification Search ............ 56/10.2 R, 56/10.4, 10.2 D, 249, 251, 294, DIG. 20
See application file for complete search history.

(56) References Cited

U.S. PATENT DOCUMENTS

| | | | | |
|---|---|---|---|---|
| 3,624,697 A | * | 11/1971 | Fuller | 56/16.6 |
| 4,205,797 A | * | 6/1980 | Bennett et al. | 241/222 |
| 4,335,569 A | | 6/1982 | Keeney et al. | |
| 4,479,346 A | | 10/1984 | Chandler | |
| 4,516,388 A | * | 5/1985 | Chandler | 56/249 |
| 4,653,256 A | | 3/1987 | Saiia | |
| 4,663,924 A | * | 5/1987 | Saiia | 56/249 |
| 4,934,612 A | | 6/1990 | Johnson | |
| 5,018,342 A | * | 5/1991 | McClure et al. | 56/10.5 |
| 5,083,976 A | * | 1/1992 | McClure et al. | 460/1 |
| 5,197,267 A | * | 3/1993 | Aldred et al. | 56/249 |
| 5,203,151 A | | 4/1993 | Mills | |
| 5,241,810 A | | 9/1993 | Reichen | |
| 5,291,724 A | | 3/1994 | Cotton | |
| 5,343,680 A | | 9/1994 | Reichen et al. | |
| 5,394,678 A | * | 3/1995 | Lonn et al. | 56/10.2 H |
| 5,477,666 A | | 12/1995 | Cotton | |
| 5,535,577 A | | 7/1996 | Chmielewski et al. | |
| 5,678,396 A | | 10/1997 | Thorman et al. | |
| 5,682,735 A | | 11/1997 | Swenson et al. | |

(Continued)

OTHER PUBLICATIONS http://www.wordreference.com/definition/forage.*

*Primary Examiner*—Meredith C. Petravick
(74) *Attorney, Agent, or Firm*—The Law Office of Randall T. Erickson, P.C.

(57) ABSTRACT

A control system for a cutting reel unit includes a height-of-cut adjusting system and a reel-to-bedknife clearance adjusting system. The height-of-cut adjusting system includes a first frame; a second frame; a cutting reel supported by the second frame; a bedknife arranged adjacent to the cutting reel and supported by the second frame; at least one support element arranged to translate along the ground and arranged to support the first frame; and at least one first actuator connected between the first frame and the second frame and arranged to adjust the relative elevation of the second frame with respect to the first frame. The reel-to-bedknife clearance adjusting system includes at least one second actuator operatively connected between the reel and the second frame and a sound detector.

25 Claims, 15 Drawing Sheets

U.S. PATENT DOCUMENTS

| | | |
|---|---|---|
| 5,732,538 A | 3/1998 | Thorman et al. |
| 5,839,321 A | 11/1998 | Siemons |
| 6,044,637 A | 4/2000 | Thier et al. |
| 6,052,973 A * | 4/2000 | Tsuchihashi et al. ............. 56/7 |
| 6,318,059 B1 | 11/2001 | Cotton |
| 2002/0095922 A1 | 7/2002 | Goman et al. |
| 2003/0140611 A1 | 7/2003 | Burke |
| 2004/0216438 A1 | 11/2004 | Schmidt et al. |
| 2004/0216439 A1 | 11/2004 | Poulson et al. |

* cited by examiner

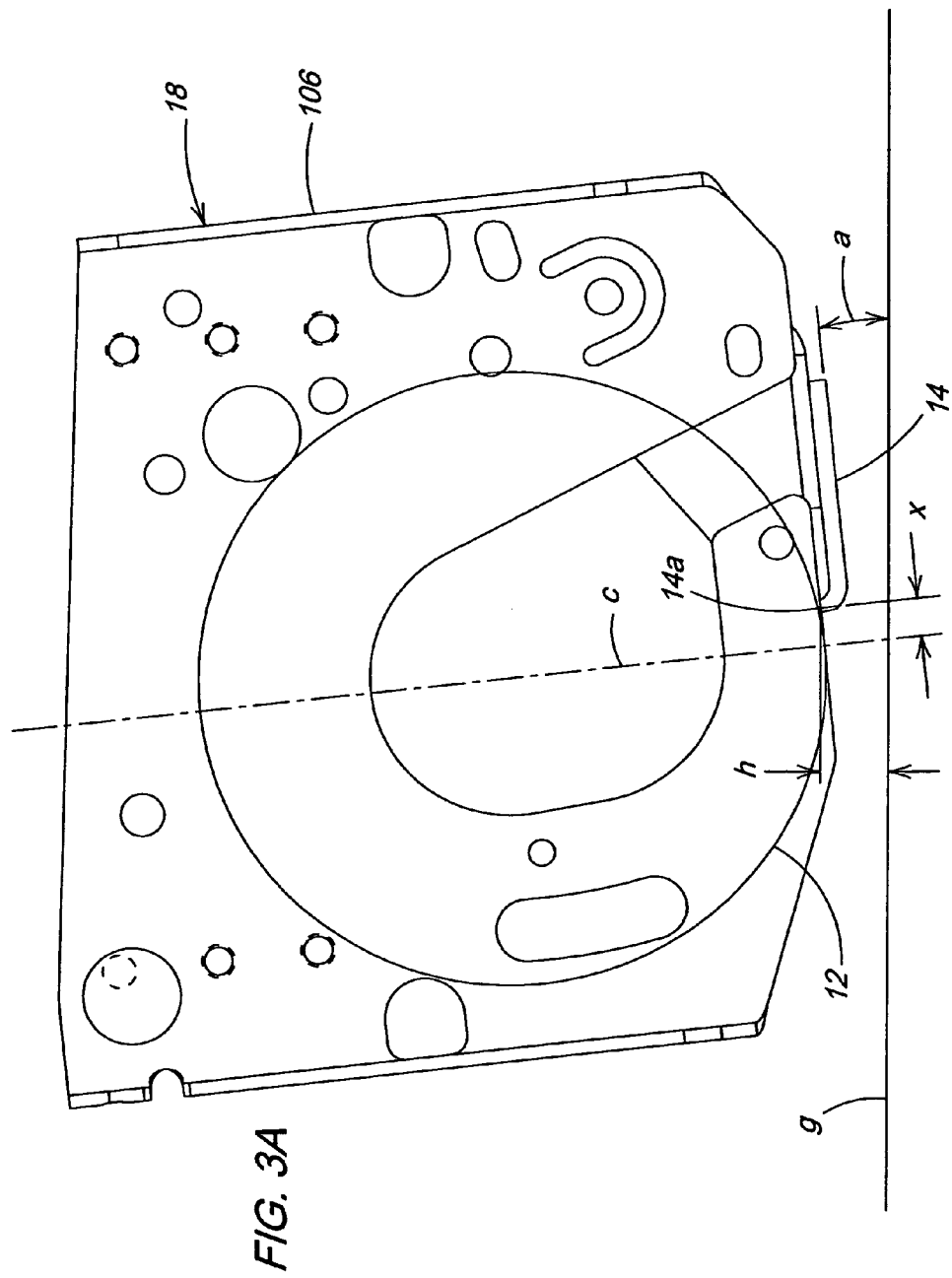

CUTTING REEL ADJUSTING SYSTEM

TECHNICAL FIELD OF THE INVENTION

The invention relates to cutting reel units for mowers, and particularly systems-based mechanisms and methods for adjusting cutting reel units.

BACKGROUND OF THE INVENTION

Conventional mowing machines have an attached cutting reel unit or multiple units. Such machines typically move the cutting reel unit across the ground adjacent to the machine. Grass beneath the cutting reel unit is mowed as the machine travels forward. Conventional reel mower vehicles can include a plurality of arm members that extend from the vehicle, each arm having a cutting reel unit attached to its outer end portion.

The cutting reel units typically include front and rear skids or rollers that support or carry the cutting reel unit across the surface of the ground during mowing operation. Such vehicles and cutting reel units are disclosed for example in U.S. Pat. Nos. 5,343,680; 5,412,931 and 5,459,984.

Conventional cutting reel units provide a plurality of blades coupled together to form a generally cylindrical reel that rotates about a transverse axis. The blades pass in close proximity to a bedknife to create a scissoring action for cutting vegetation such as grass. A frame typically houses the reel and bedknife. Wheels, rollers or skids are coupled to the frame for engaging or rolling across the ground to operatively support the reel and bedknife at a predetermined height above the ground. The height at which grass is cut is therefore determined by the height at which the wheels, rollers or skids carry a frame, reel and bedknife above the ground. Cutting reel units are typically used for mowing golf courses or other areas were a relatively low and accurate cut is desirable.

To produce a high quality cut, and a cut that is even for multiple cutting reel units and across mowing passes by a machine with multiple cutting reel units, it is necessary that the height-of-cut for each cutting reel unit be properly adjusted. It is known that reel mowers have an adjustment mechanism for adjusting the reel mowing height. One type of height adjustment mechanism utilizes a plurality of vertically aligned holes for a cutting unit frame. The rollers are coupled to a mounting member or plate that includes an opening. The mounting plate is coupled to the frame by insertion of a pin through both the mounting plate opening and one of the holes defined by the cutting unit frame. The cutting height can be varied by inserting the pin through a different hole in the frame. Other types of height adjustment mechanisms utilize threaded bolts which set the adjustment height using nuts engaged on the bolts and positionable to support a portion of the frame such that the cutting reel unit is held securely in the desired vertical position with respect to the rollers. A wrench is used to adjust the nuts to positions on the bolts to thereby adjust the cutting height.

Another type of cutting reel unit utilizes a slotted mounting arm that is coupled with the rollers. A bolt received by the slot is used to adjust the height by loosening the bolt and shifting the slide-mounting arm to a new position.

For all height-of-cut adjustments, there is a generally accepted and common method for determining a cutting reel unit's existing height-of-cut and how far it needs to be adjusted towards a targeted adjustment. The procedure for setting the cutting height typically involves fastening a gauge bar to the bedknife such that the upper surface of the bar is parallel to a forward, horizontal position of the bedknife and at the desired distance below the cutting edge of the bedknife. The front and rear rollers are then adjusted to come into contact with the upper surface of the gauge bar.

The adjustment relationship between the front and rear rollers—relative to the cutting reel itself—is often termed the 'angle of attack' for the bedknife. This relationship refers to the relative pitch (front to back) or angle of the bedknife in relation to the ground surface. The angle of bedknife attack is an important parameter which affects the cut quality and effectiveness. Varying the height-of-cut must take the angle of attack into consideration.

Cutting reel units cut properly only if the reel-to-bedknife clearance is properly adjusted. Currently, the reel-to-bedknife clearance is manually adjusted. The adjustment is made on a regular basis, typically before use, or made during or after use when poor cut quality is detected. Sometimes the adjustment is made such that the reel touches the bedknife and then the reel and bedknife are allowed to wear into place. Adjustments are also made after repair or replacement of the reel or bedknife.

Specifically, the reel-to-bedknife clearance is adjusted by moving the reel away from the bedknife to allow a specific gap—that is even across the length of the reel and bedknife—between both the reel and bedknife. The gap is then measured by inserting a feeler gauge (of the same thickness as the adjustment gap) between the reel and bedknife. The adjusted gap between the reel and bedknife is determined to be accurate when the feeler gauge can be moved smoothly between the reel and bedknife across the entire length of the reel and bedknife, such that there is only a slight drag of the feeler gauge as it is moved across this length. To verify reel and bedknife sharpness and a correct reel-to-bedknife adjustment, a single strip of paper is often inserted between the reel blade and bedknife while the reel is turned forward by hand. If the reel cuts the paper, the sharpness and adjustment are usually determined to be correct. The quality of the cut of the piece of paper across the single sheet can be examined to indicate whether the clearance is correct.

Reel adjustments are also necessary when a cutting reel unit is "re-tasked," in effect, adjusted for cutting another type of grass or grass to be cut to a different height. For example, a cutting reel unit could be re-tasked from an adjustment appropriate for a golf course fairway to adjustment appropriate for a golf course green, the two areas having different grass height requirements. However, re-tasking a cutting reel unit is time-consuming. To avoid re-tasking cutting reel unit, many golf courses have cutting reel units or cutting machines which remain designated or pre-adjusted for particular grass requirements, in effect, a designated group of cutting units for different areas of the golf course. This technique necessitates multiple cutting units or cutting machines. Multiple cutting units or machines can result in higher capital costs and maintenance costs.

The present inventors have recognized that the cut quality of a reel mower is largely determined by the accuracy and precision of adjustment of several key factors. The present inventors have recognized that proper mower adjustments are often hard to achieve through manual adjustment methods.

The present inventors have recognized that the reel-to-bedknife adjustment is one such adjustment that needs to be adjusted accurately and precisely, but is often hard to achieve on individual mowing reels. The present inventors have recognized that the reel height-of-cut adjustment is another such adjustment that needs to be adjusted accurately and precisely, but is also difficult to adjust on individual mowing reels.

The present inventors have recognized that the accuracy and precision of these adjustments can be improved through automated adjustments.

The present inventors have recognized that a need exists for dynamic adjustment capability for multi-area mowers or mowers that are capable of mowing multiple areas having different cutting requirements. The present inventors recognize that a need exists to be able to re-task a cutting reel unit dynamically to allow a single machine to mow multiple area types with different cutting reel unit setup requirements.

The present inventors have recognized the need to also modulate reel speed, to provide reel-to-bedknife contact detection, and to make cutting reel unit adjustments during operation of the cutting reel unit.

The present inventors have recognized the need to improve the adjustment process to ensure a shorter required time, ease of adjustment, and improved reel operation quality.

SUMMARY OF THE INVENTION

The invention provides a control system for adjusting the reel of a cutting reel unit. The cutting reel unit can be carried by, or attached to, a vehicle, such as a tractor, singularly or as one of a plurality of cutting reel units, or can be incorporated into a riding mower, a walking mower or a ride-on mower, also singularly or as one of a plurality of cutting reel units.

The control system can control reel-to-bedknife clearance, height-of-cut, lateral leveling of the reel, and the reel rotational speed.

The cutting reel unit control system can be implemented through a variety of control architectures such as distributed control or centralized control. The control protocol can be CAN, serial, or other control protocols.

The cutting reel unit control system can be automatically self-adjusting, which periodically corrects the reel adjustments such as the reel speed, the height-of-cut, the reel lateral leveling, and the reel-to-bedknife clearance, or corrects the reel to bedknife clearance if contact between the reel and bedknife is sensed during operation.

The cutting reel unit control system can be configured as a central controller or by controllers located at each cutting unit, or even by a local controller designated for each actuator. The cutting reel unit control system can be adjusted after operator or automatic initiation of an adjustment routine in a central controller or by operator or automatic initiation of control routines performed by controllers at each cutting unit or at each actuator.

The cutting reel unit adjustment can be made by a controller external to the cutting unit, such as by a control unit that is used in a shop to re-adjust or re-task a cutting unit for a pre-selected grass condition or area and desired height-of-cut.

Alternatively to operator initiation, the cutting reel adjustments can also be initiated by a controller or control units that is/are responsive to a sensor such as a height of grass sensor, or by a location sensor and/or sender on the cutting unit or cutting machine that communicates with an external ground-based system or a global positioning system (GPS). These systems, responsive to external conditions, along with the onboard control systems as described herein facilitate implementation of the control system in either a manned cutting machine or an autonomous cutting machine.

For example, different areas of a golf course could be mapped electronically and preprogrammed into the onboard or remote controller and such controller could communicate with the external positioning system and thereafter adjust the actuators to adjust the cutting unit for the type of grass, the area, and desired cut lines for corresponding areas of the golf course.

The apparatus of the invention includes a cutting reel, a frame supported on at least one support element that is supported on, and is movable along, the ground, and a housing supporting the cutting reel, the housing movably mounted on the frame. A bedknife is carried on the frame. An actuator has a first portion connected to the frame and a second portion connected to the housing, wherein a distance between the first and second portions is adjustable to set spacing between the reel and the bedknife, and including a motive mechanism that is activated to adjust the distance.

The cutting reel can be one driven in rotation by one or more hydraulic motors, electric motors, by the traction drive of the mower machine or vehicle, or by other type drive.

Two actuators can be used, one actuator located at each end of the reel, and the actuators each have a first portion connected to the frame and a second portion connected to one of two housings that support ends of the reel, wherein a distance between the first and second portions is adjustable, and including a motive mechanism that is activated to adjust the distance.

According to another aspect of the invention, a control system for a cutting reel unit includes a first frame; a second frame; a cutting reel supported by the second frame; a bedknife arranged adjacent to the cutting reel and supported by the second frame; at least one support element arranged to translate along the ground and arranged to support the first frame; at least one first actuator connected between the first frame and the second frame and arranged to adjust the relative elevation of the second frame with respect to the first frame; at least one second actuator operatively connected between the reel and the second frame and arranged to adjust the clearance between the reel and the bedknife; and a controller signal-connected to the first and second actuators.

The control system can further comprise position sensors that are signal-connected to the controller, the position sensors determining the precise elevation of the reel with respect to the at least one support element and determining the position of the reel with respect to the bedknife.

The control system can include a sound detector arranged in close proximity to the bedknife to detect touching between the cutting reel when spinning and the bedknife.

According to another aspect of the invention, an improved anti-backlash arrangement is provided for a linear actuator. The linear actuator includes a stepper motor that drives a lead screw that advances or retracts a rod from a housing. The anti-backlash arrangement includes an anti-backlash nut threaded on the lead screw and a spring. The spring is connected to an end of the rod and to the anti-backlash nut. The anti-backlash nut has a first surface abutting a second surface of the rod, the spring pressing the first and second surfaces together such that thread play between the rod and the lead screw is removed. The first and second surfaces are preferably conically shaped and nest together.

The disclosed invention provides advantages in that the apparatus and method allow for rapid and automatic adjustment of the reel-to-bedknife gap without operator intervention following operator initiation of the adjustment. The reel can be adjusted in seconds. The method has speed and consistency advantages over manual adjustment, and does not require detection of poor cut quality or excess surface wear in order to perform the automatic adjustment.

The disclosed invention provides advantages in that the apparatus and method allow for rapid and automatic adjustment of the height-of-cut of a reel of a cutting reel unit without operator intervention following operator initiation of the adjustment. The reel can be adjusted in seconds. The method has speed and consistency advantages over manual adjustment, and does not require detection of poor cut quality in order to perform the automatic adjustment.

By making these adjustments automatically, the reel adjustment process may be accomplished more consistently without the presence of a skilled mechanic. The automated adjustment also provides the capability for the support of autonomous equipment.

The control system allows a cutting reel unit to be rapidly re-tasked to cut different grass heights for different areas of a golf course. The system allows a single cutting reel unit to be readily usable for multiple golf course areas.

Numerous other advantages and features of the present invention will be become readily apparent from the following detailed description of the invention and the embodiments thereof, from the claims and from the accompanying drawings.

BRIEF DESCRIPTION OF THE DRAWINGS

FIG. 3A is a schematic view of a reel position with respect to a bedknife position;

DETAILED DESCRIPTION OF THE PREFERRED EMBODIMENTS

Figure 1:
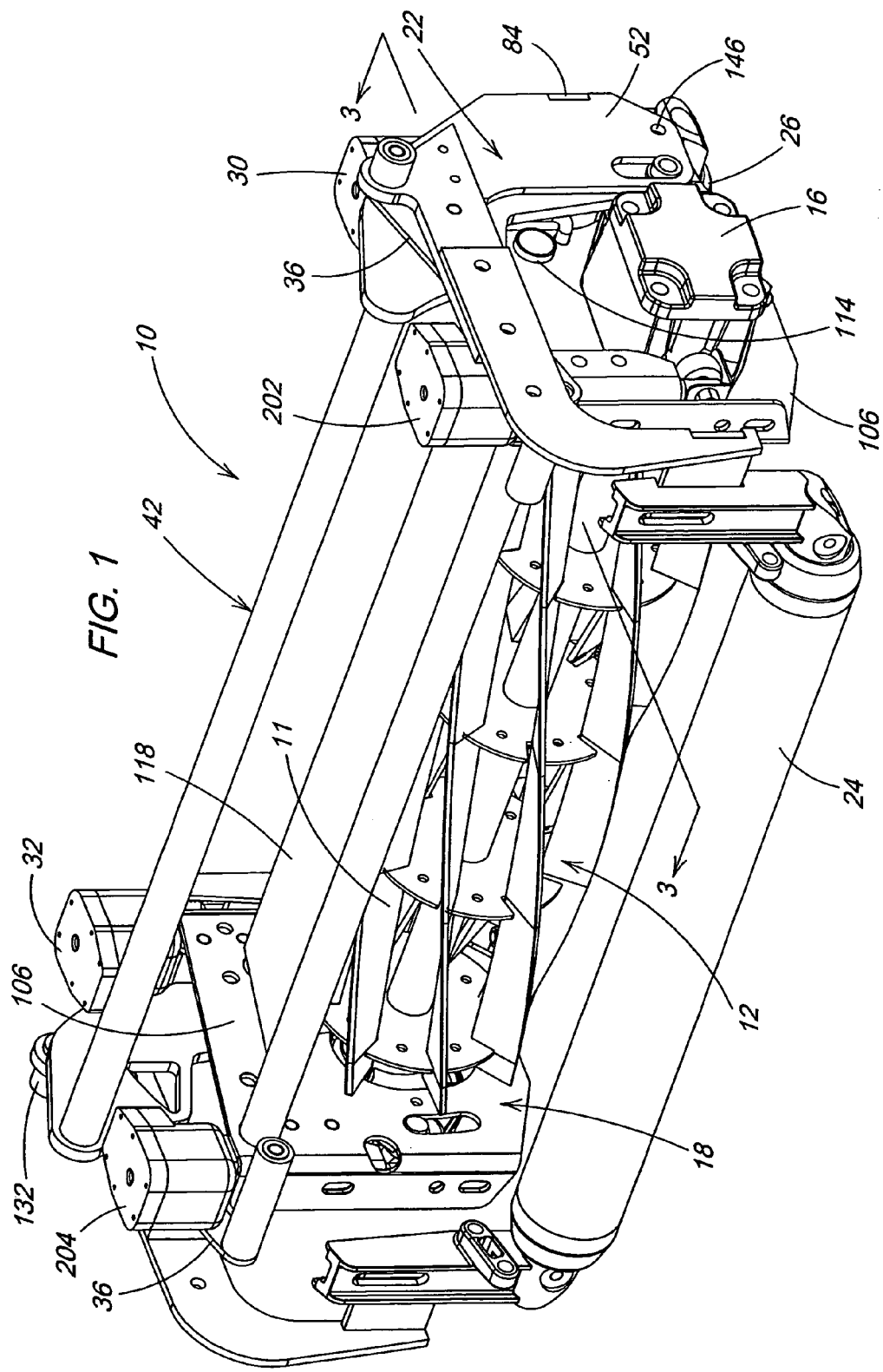
FIG. 1 is a perspective view of a cutting reel unit according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
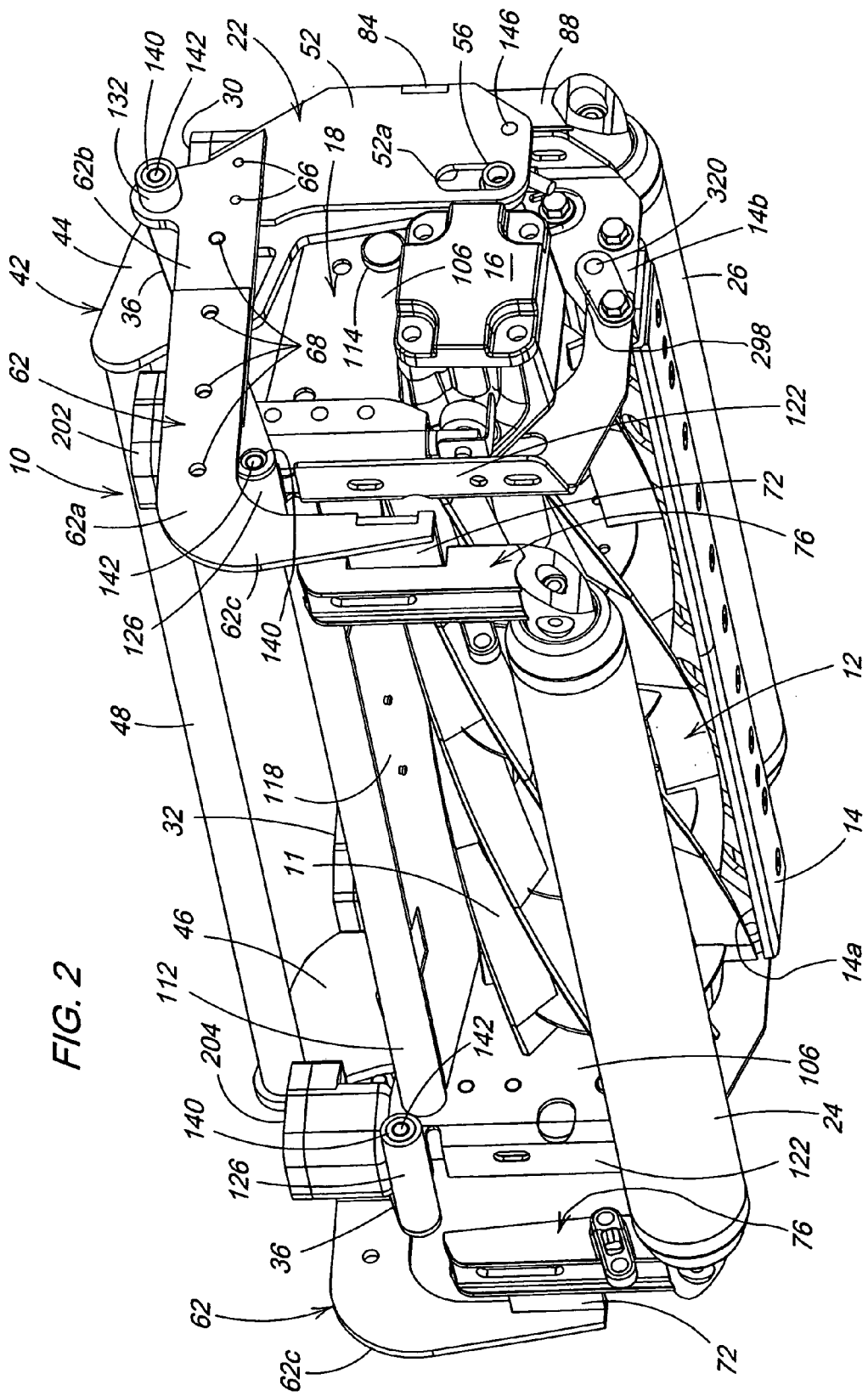
FIG. 2 is a bottom perspective view of the cutting reel unit of FIG. 1.

FIGS. 1 and 2 illustrate a mower cutting reel unit 10 according to the present invention. The mower cutting reel unit 10 is adapted to be pulled alone or within a group of like units by a vehicle such as described in U.S. Pat. Nos. 5,343,680; 5,412,931 or 5,459,984, herein incorporated by reference. A plurality of blades 11 are coupled together to form a generally cylindrical reel 12 which rotates about a transverse axis in close proximity to an edge 14a of a bedknife 14 (FIG. 2) for cutting vegetation, such as grass, with a scissoring action. A motor 16, carried at one side of a frame 18 that generally houses and supports the reel 12, drives the reel 12. The motor 16 can be a hydraulic, electric or other type motor. Alternatively, a transmission arrangement between the traction drive of the machine or vehicle and the reel can be used to rotate the reel. A hydraulic motor is indicated in the figures.

The inside frame 18 is carried by an outside frame 22. The outside frame 22 is supported on front and rear rollers 24, 26 respectively. The inside frame 18 is supported on the outside frame 22 by actuators 30, 32 and by struts 36, 36. The struts 36, 36 are substantially mirror-image identical in configuration. A pushing or towing frame 42 is arranged between the inner and outer frames 18, 22. The towing frame 42 includes vertical plates 44, 46 fastened to side plates 52, 54 of the outer frame 22 by pins 56, 58 residing in slots 52a, 54a. The slots 52a, 54a are part of a mechanism which permits the reel to be pushed from the rear when rolling, and still touch down heel first when lowered.

A crossbar 48 connects the side plates 44, 46. A vehicle connector or lift arm can be engaged at a select position along the crossbar 48 to tow or push the cutting unit 10 along the ground during the cutting operation.

The outside frame 22 also includes adjustable bracket members 62, 62 connected by fasteners 66 to a respective side plate 52, 54. The bracket members 62, 62 are substantially mirror-image identical in configuration. The bracket members 62, 62 each include a short L-shaped member 62a and a horizontal member 62b. The members 62a, 62b include a series of holes 68 wherein a registered pair of holes between the members is selectable to set a horizontal overall dimension of the bracket members 62, 62 using fasteners through the registered pair of holes. The selectable dimension is useful where additional accessories are to be used, for example a conditioner, or a device that contacts and manipulates the grass immediately before it is cut by the reel and bedknife, could be added to the unit 10 behind the roller 24. The unit 10 is shown with holes 68 selected to set a maximum horizontal dimension of the bracket members 62, 62 such as would be used when a conditioner (not shown) would be installed behind the front roller 24. With just the front roller 24 used, different holes 68 would preferably be selected to set a minimum horizontal dimension of the bracket members 62, 62. Vertical portions 62c, 62c of the members 62, 62 extend downward to be connected via plates 72, 72 to front support assemblies 76, 76 that are supported by the front roller 24. The front support assemblies 76, 76 are substantially mirror-image identical in configuration.

Plates 84, 84 connect the outer frame side plates 52, 52 to rear support assemblies 88, 88 that are supported by ends of the rear roller 26. The rear support assemblies 88, 88 are substantially mirror-image identical in configuration.

The inside frame 18 includes side plates 106,106 connected together by crossbars 112, 114. The side plates 106,106 are substantially mirror-image identical in configuration. A grass deflector plate 118 is arranged between the bars 112, 114 above the reel 12. The side plates each include a front flange 122. A tube 126 is welded to each of the front flanges 122. A tube 132 is also welded to each of the members 62b. Sleeve bearings 140 are fit into each tube and a pin, bolt or other fastener 142 is used to pivotally connect each of the angled struts 36 to a respective pair of tubes 126, 132.

Figure 3:
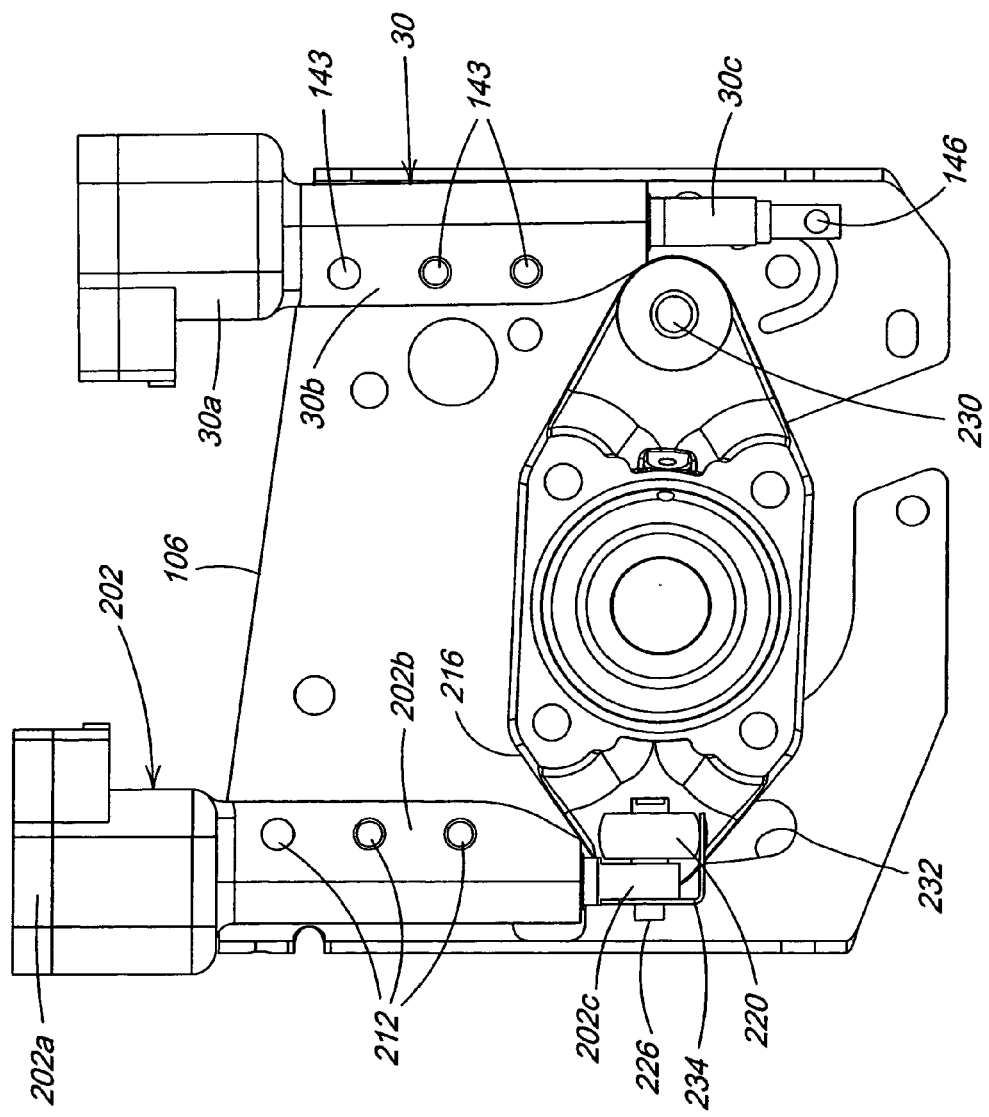
FIG. 3 is a fragmentary sectional view taken generally along line 3—3 of FIG. 1, with portions of the cutting unit removed for clarity of description, with the reel pivoted away from the bedknife.

FIG. 3 illustrates right side components of the unit 10. The left side components are configured in substantially the same, but mirror-image manner. The actuators 30, 32 each include a motor drive 30a, a housing 30b, and an actuator rod 30c extending out of a bottom of the housing 30b. The rod 30c extends or retracts vertically from the housing 30b by a selected turning direction of the motor drive 30a. The housing 30b is fastened to the respective side plate 106 by fasteners 143. The rod 30c is pivotally fastened to the outer frame 22, particularly to the respective outer frame side plate 52 by a fastener or pin 146.

Thus, extension of the rods 30c from the housings 30b, of the actuators 30, 32, lifts the inside frame 18 with respect to the outside frame 22. Retraction of the rod 30c into the housing 30b, of the actuators 30, 32, lowers the inside frame 18 with respect to the outside frame 22.

The struts 36, 36 (FIGS. 1 and 2) prevents excessive forward or rearward tipping of the inside frame 18 lifted or lowered at the rear thereof and ensures a substantially straight vertical lifting or lowering of the inside frame 18. The geometry of the frames 18, 22, struts 36, 36 and actuators 30, 32 advantageously slightly tip the reel and bedknife forward with rising height-of-cut. This change in the "angle of attack" results in a more effective cutting.

FIG. 3A illustrates schematically the side plate 106 and an outline of the reel 12 wherein the height-of-cut "h" from grade "g" and an offset "x" from the reel centerline "c" are shown. The attack angle "a" is also shown. Effective guideline maximum attack angles "a" with respect to height-of-cut are:

"h"=6 mm, "a"=0 deg
"h"=20 mm, "a"<1.3 deg
"h"=75 mm, "a"<5deg

The preferred embodiment of the invention satisfies these guidelines.

For the preferred embodiment, the table below sets forth the relative positioning of the profile of the edge 14a with respect to the reel centerline "c" as the inside frame 18 is lifted through a range of height-of-cut "h" and tilted over a range on attack angles "a".

| "h" | "a" | "x" |
|---|---|---|
| 10 mm | 0.38 deg | 6.95 mm |
| 15 mm | 0.81 deg | 7.38 mm |
| 20 mm | 1.20 deg | 7.77 mm |
| 25 mm | 1.55 deg | 8.12 mm |
| 30 mm | 1.86 deg | 8.43 mm |
| 35 mm | 2.13 deg | 8.70 mm |
| 40 mm | 2.36 deg | 8.93 mm |

-continued

| "h" | "a" | "x" |
|---|---|---|
| 45 mm | 2.56 deg | 9.13 mm |
| 50 mm | 2.72 deg | 9.29 mm |
| 55 mm | 2.86 deg | 9.43 mm |
| 60 mm | 2.95 deg | 9.52 mm |
| 65 mm | 3.02 deg | 9.59 mm |
| 70 mm | 3.05 deg | 9.62 mm |
| 75 mm | 3.06 deg | 9.63 mm |

Figure 4:
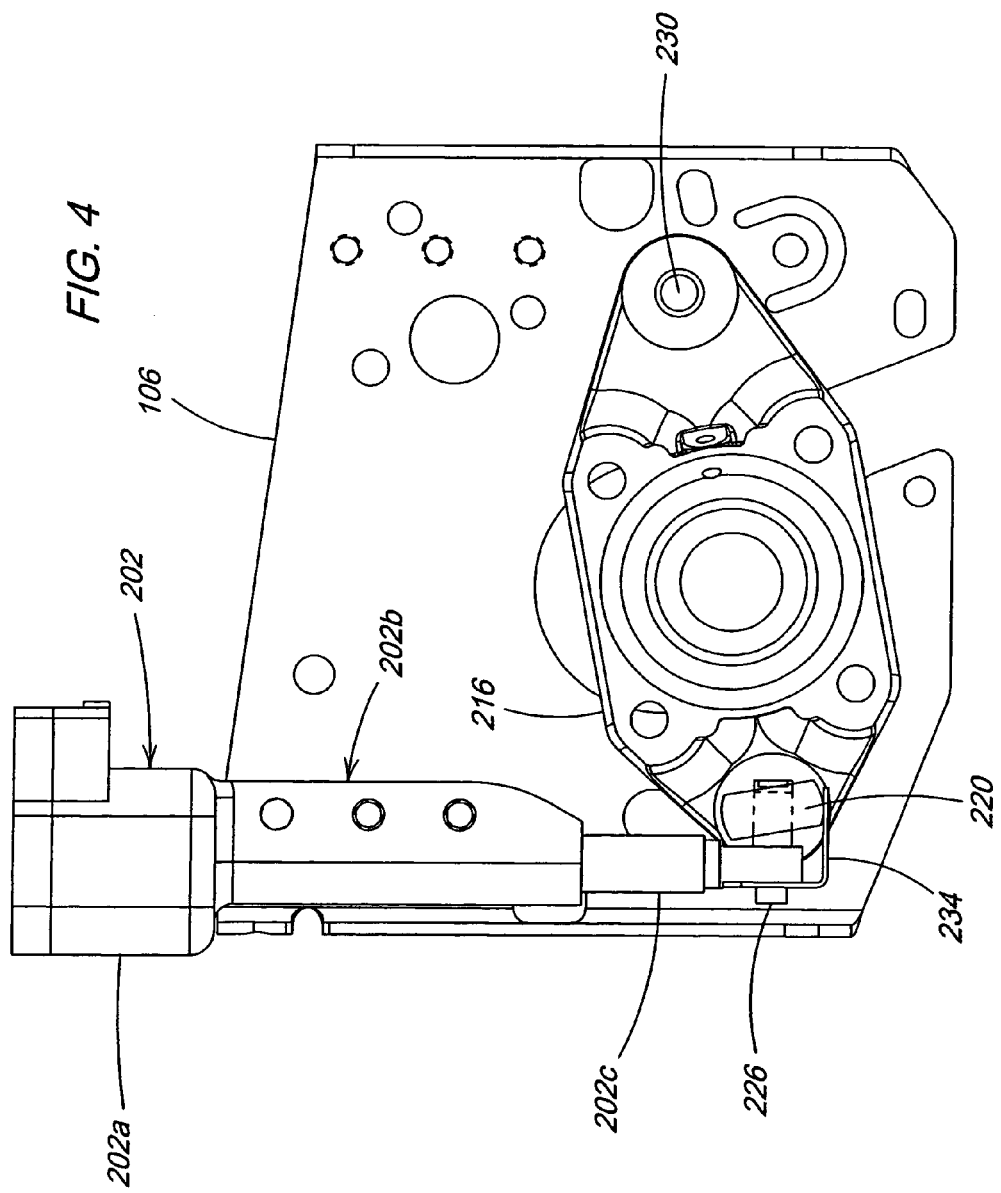
FIG. 4 is a sectional view similar to FIG. 3 with portions removed for clarity of description with the reel pivoted toward the bedknife.

Actuators 202, 204 are provided on a front side of the inside frame 18 adjacent opposite ends of the reel 12. As illustrated in FIGS. 3 and 4, the actuators each include a motor actuator 202a, a housing 202b, and an actuator rod 202c. The housing 202b is fastened to the respective side plate 106 by fasteners 212. The rods 202c, 202c are fastened to respective reel bearing housings 216, 216 that journal the reel 12 at opposite ends of the inside frame 18. Each rod 202c is pinned to a ball joint 220 that is fixed to the respective housing 216, by an elongated pin 226.

Each reel bearing housing 216 is pinned to a respective side plate 106 by a pin or fastener 230. The extension or retraction of the rods 202c, 202c with respect to the housings 202b, 202b of the actuators 202, 204, pivots the reel bearing housings 216, 216 about the pins or fasteners 230, 230. As illustrated in FIG. 4, by extending the rods 202c, 202c and pivoting the reel housings 216, 216, the blades 11 can be brought closer to or further from the bedknife 14 (FIG. 2), particularly, closer to or further from an edge 14a of the bedknife 14.

Figure 10:
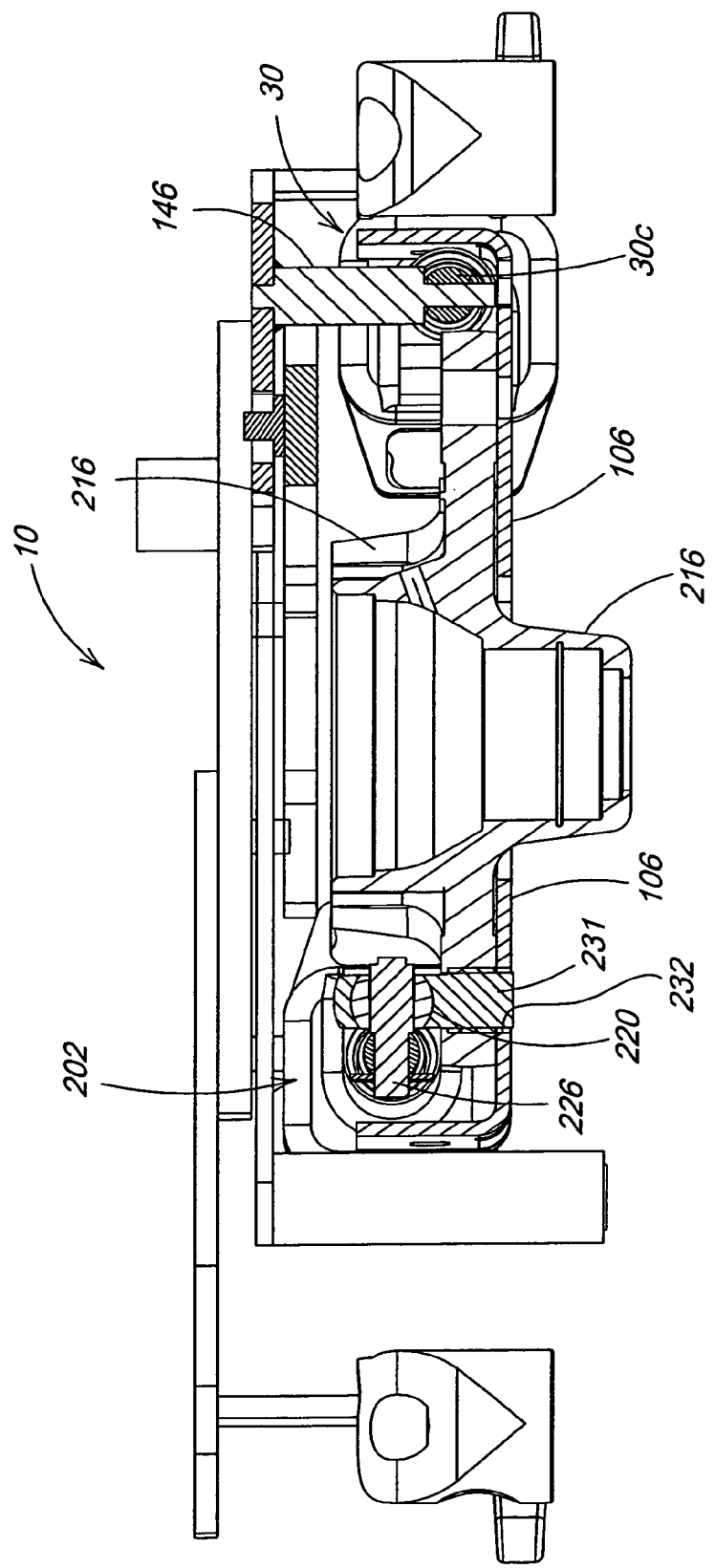
FIG. 10 is a fragmentary, partial sectional view taken generally along offset line 10—10 of FIG. 8.
Figure 11:
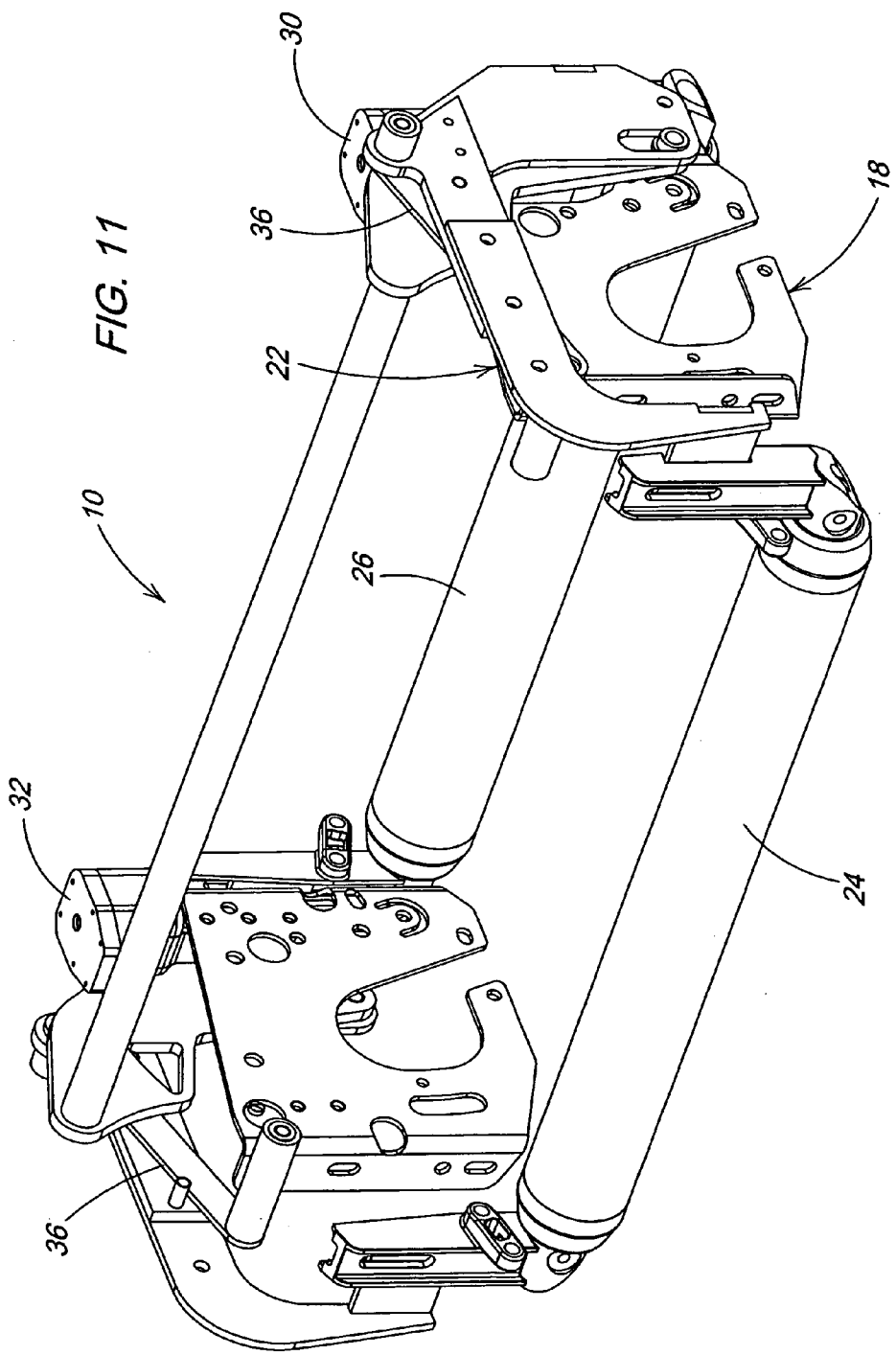
FIG. 11 is a perspective view of the unit shown in FIG. 1 with the reel removed for illustrating underlying parts.

Each ball joint 220 is carried on the base pin 231 (FIG. 10) that is fixed to the bearing housing 216 by being threaded tightly to the bearing housing using a thread-locking compound such as a LOCTITE® thread-locking product. The base pin 231 extends through the bearing housing to slide through a slot 232 formed in the side plate 106. For each actuator 202, 204, an L-shaped spring 234 is fixed to the rod 202c and presses against the ball joint 220 to bias the rod 202c in the downward direction, to remove play within the ball joint 220.

Figures 5, 6:
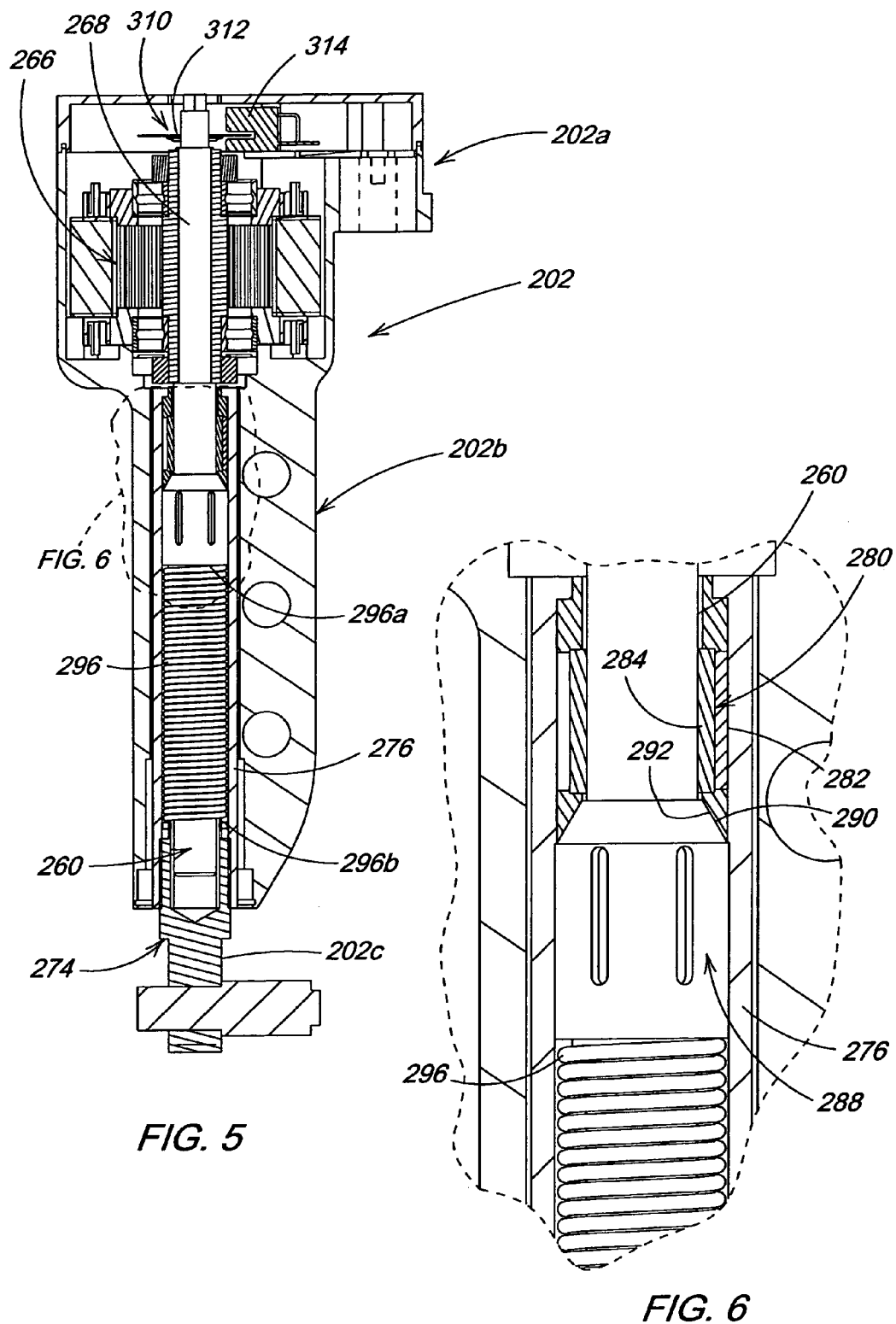
FIG. 5 is a sectional view of an actuator as shown in FIG. 3.
FIG. 6 is an enlarged fragmentary sectional view of a portion of the actuator shown in FIG. 5.
Figure 7:
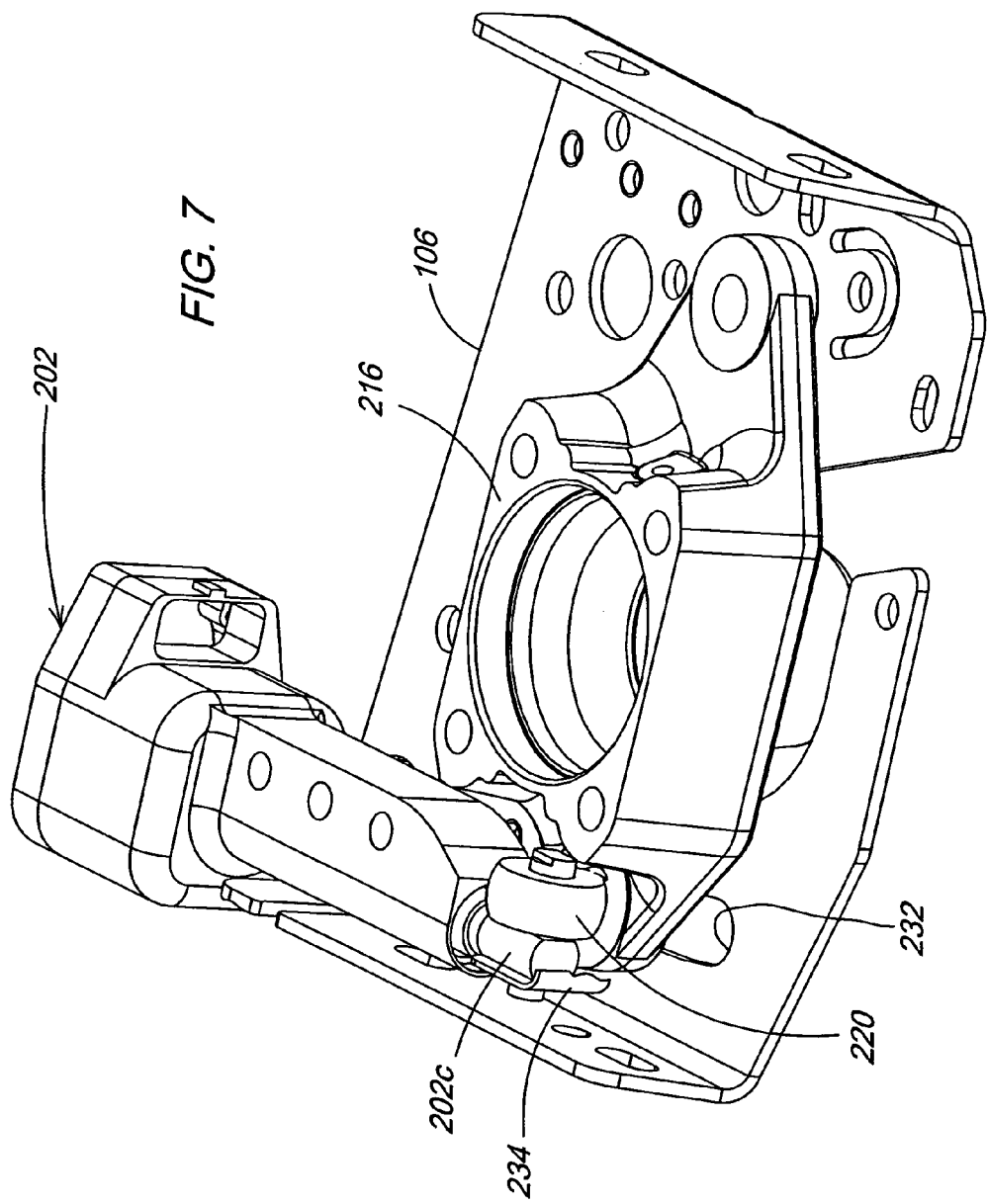
FIG. 7 is a bottom perspective view of the components shown in FIG. 4.

FIGS. 5 and 6 illustrate a typical actuator 30, 32, 202, 204 such as the actuator 202. The actuator 202 includes the motor drive 202a, the housing 202b and the rod 202c. Inside the housing 202b there is a drive screw or lead screw 260 that is driven into rotation by a stepper motor 266 of the motor drive 202a. The lead screw 260, being an extension of a motor shaft 268, is rotated by the stepper motor 266.

The rod 202c is a substantially hollow cylinder and includes a rod end portion 274 fixed to a rod body portion 276 by threaded mutual engagement. The lead screw 260 extends substantially through the body portion 276. A lead nut 280 is fixed to the rod body portion 276. The lead nut 280 can include an outer metal casing 282, such as brass, and an inner sleeve 284, such as plastic, having internal Acme threads engaged to corresponding external Acme threads on the lead screw 260. The lead screw 260 can be stainless steel. Alternatively, the lead nut could be formed as a unitary part with the rod body portion 276, such as both being formed of plastic or metal.

An anti-backlash nut 288 is threaded onto the lead screw 260. The anti-backlash nut 288 also includes Acme threads, preferably plastic, and engaged to the external threads of the lead screw 260. The anti-backlash nut 288 includes a convex conical tapered surface 290 which abuts a concave conical tapered surface 292 of the rod body portion 276 or the lead nut 286 fixed to the rod body portion 276.

A coil spring 296 surrounds the lead screw 260. The coil spring 296 is connected to the anti-backlash nut at one end 296a and to the rod end portion 274 at an opposite end 296b.

The anti-backlash feature of the invention is provided by the resilient force of the anti-backlash nut 288 urged in rotation around the lead screw 260 by the spring 296, against the rod body portion 276 or lead nut 286. This force takes up all thread play between the lead screw 260 threads and the lead nut 280 threads. The anti-backlash nut 276 and the lead nut 286 advance and retreat substantially together on the lead screw 260.

The inclination of the surfaces 290, 292 increases the normal force between the lead nut 280 and the anti-backlash nut 276 or the rod body portion 276, wherein the inclination is steeper than the inclination of the Acme threads of the anti-backlash nut 276 and lead screw 260. This causes the anti-backlash nut 276 to press against the lead nut 280 or the rod body portion 276 sufficiently to remove play in the engaged threads, but will prevent the anti-backlash nut 276 and lead nut 280 from tightening excessively on the lead screw 260.

The anti-backlash nut 288 and the spring 296 can be eliminated in the actuators 30, 32 where fine positioning accuracy is not required. The anti-backlash feature is most advantageous for the actuators 202, 204 where fine positioning accuracy is desired.

The motor drive 202a includes windings 306, bearings 308, and an optical encoder 310. The encoder 310 includes a target disk 312 and a read head 314. The read head 314 includes two spaced-apart light emitting and reading devices, used to determine position of the rotating target disk and also its direction of rotation. To set absolute position of the rod, the rod can be extended or retracted by the stepper motor 266 to maximum or minimum extension, until the motor 266 stalls. At this position, the encoder will send no more pulses to the controller since the target disk stops rotating. This sets the maximum extension or maximum retraction. The stepper motor 266 can then be reversed and selectively driven a pre-selected amount to properly position the rod end portion 274.

Figure 8:
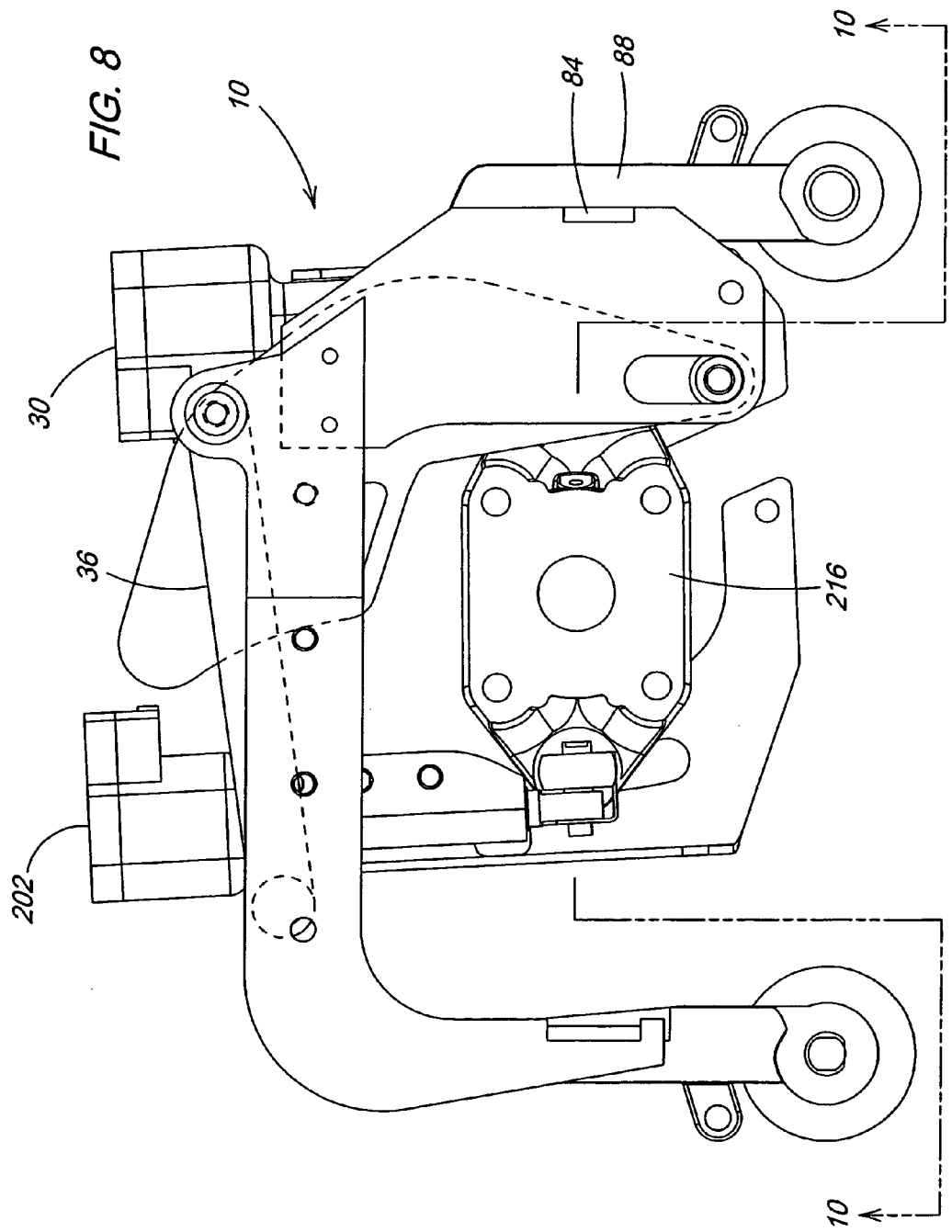
FIG. 8 is a side view of the cutting unit shown in FIG. 1 with portions removed for clarity of description wherein the reel is illustrated in an elevated operating position.
Figure 9:
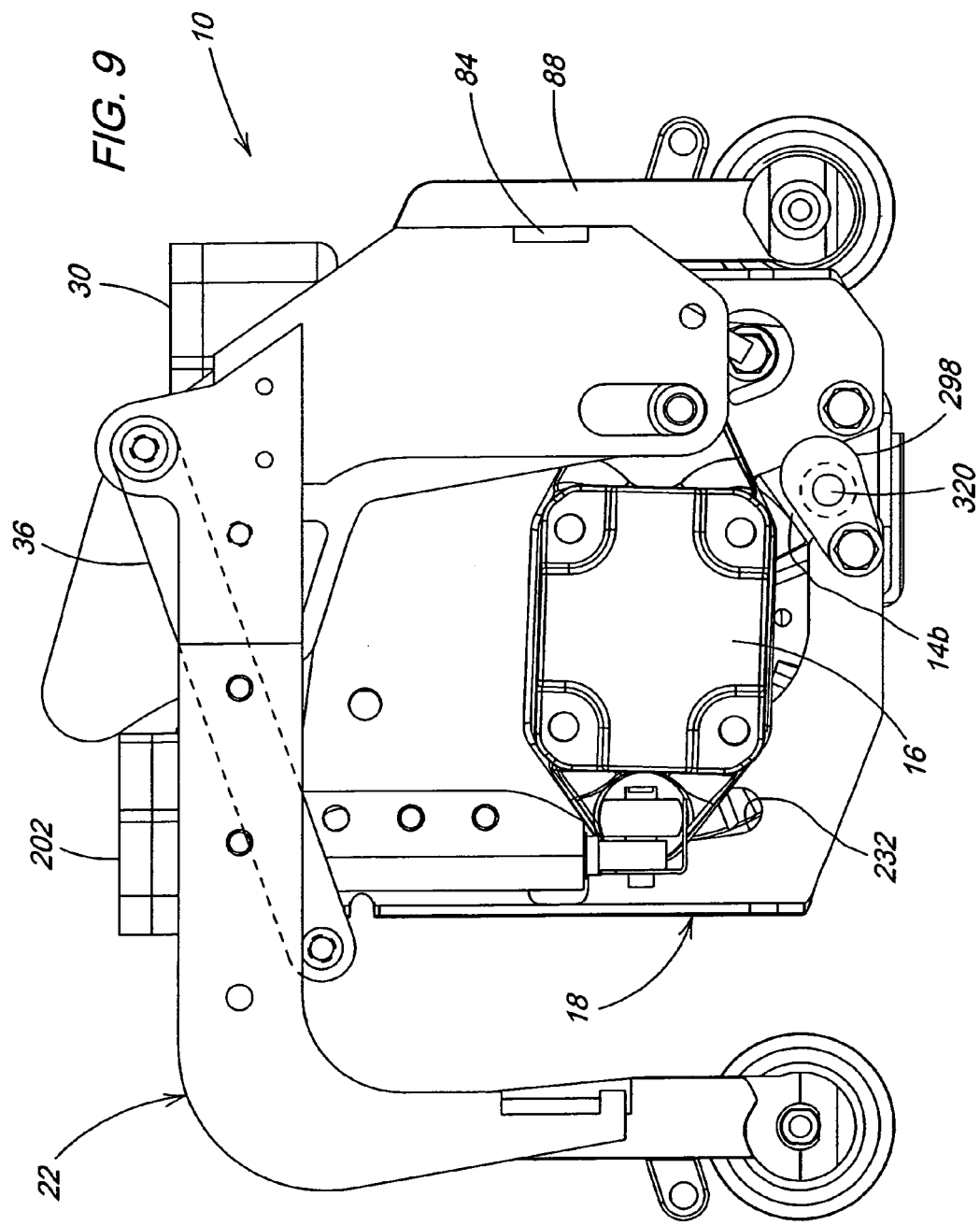
FIG. 9 is a side view of the unit shown in FIG. 1 wherein the reel is illustrated in a lowered operating position.

FIGS. 7 through 9 and 11 illustrate further views of the unit 10 with different components removed for clarity of description. FIG. 8 illustrates the inside frame 18 in a lowered position with respect to the outside frame 22. FIG. 9 illustrates the inside frame 18 in a raised position with respect to the outside frame 22. FIG. 9 illustrates a detector 320 (described below) mounted on a plate 298 and positioned adjacent to an end wall 14b of the bedknife 14. An identical detector 320 can be installed in mirror-image fashion to an opposite end wall of the bed knife.

Figure 12:
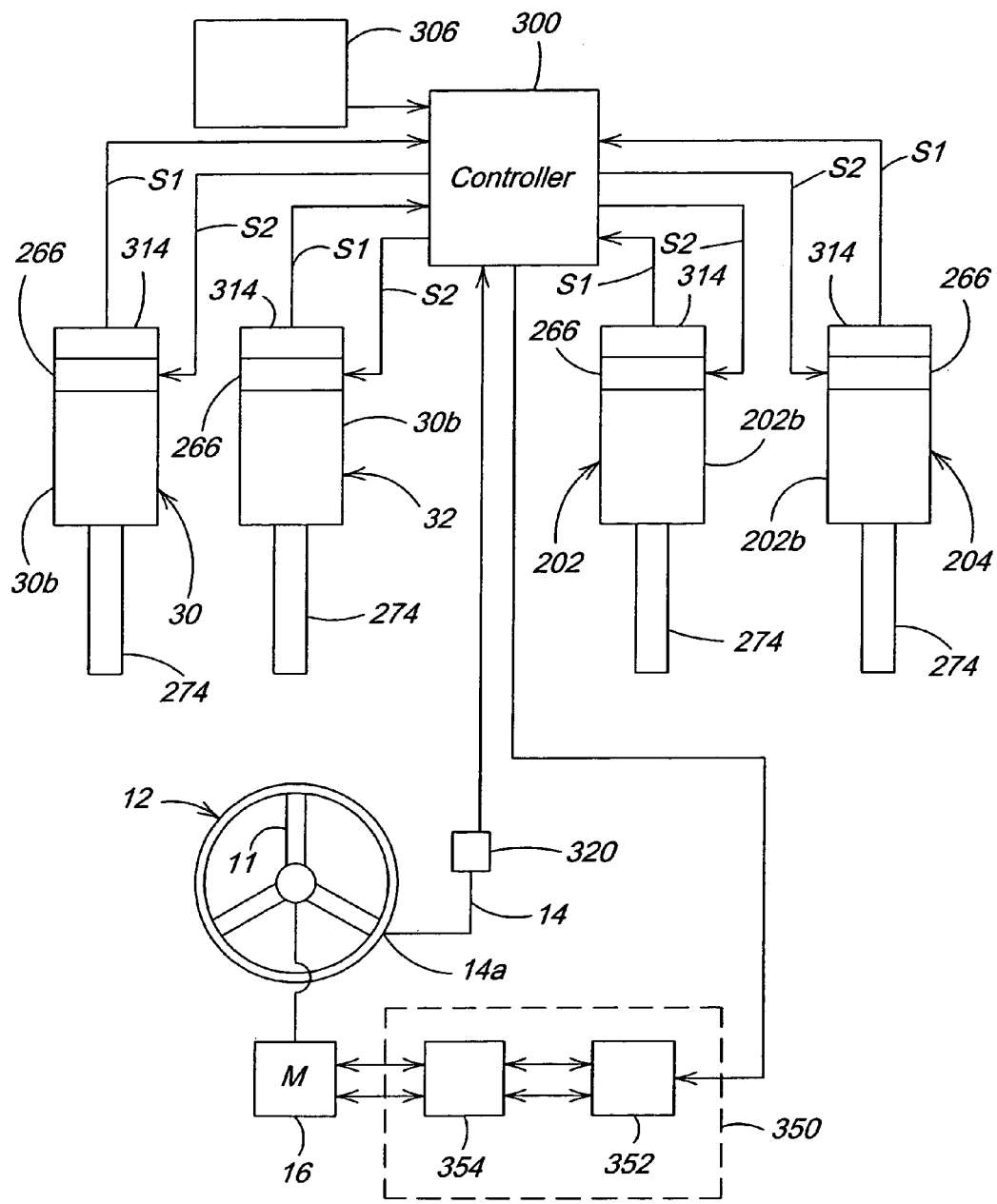
FIG. 12 is a schematic diagram of a control system of the present invention.

FIG. 12 illustrates a controller 300, such as a microprocessor, used to control the actuators 30, 32, 202, 204. An operator input station 306 such as a keypad is provided for giving instructions to the controller 300.

Alternatively, the cutting reel unit control system can be automatically self-adjusting, which periodically corrects the reel adjustments such as the reel speed, the height-of-cut, the reel lateral leveling, and the reel-to-bedknife clearance, or corrects the reel to bedknife clearance if contact between the reel and bedknife is sensed by the detector 320 during operation.

The cutting reel unit control system can be configured as a central controller or by controllers located at each cutting unit, or even by a local controller designated for each actuator. The cutting reel unit control system can be adjusted after operator or automatic initiation of an adjustment routine in a central controller or by operator or automatic initiation of control routines performed by controllers at each cutting unit or at each actuator.

The cutting reel unit adjustment can be made by a controller external to the cutting unit, such as by a control unit that is used in a shop to re-adjust or re-task a cutting unit for a pre-selected grass condition or area and desired height-of-cut.

The cutting reel adjustment can also be initiated by the controller responsive to an external sensor such as a height of grass sensor, or responsive to a location sensor and/or sender on the cutting unit or cutting machine that communicates with an external ground-based system or a global positioning system (GPS). These systems, responsive to external conditions, along with the onboard control systems as described herein facilitate implementation of the control system in either a manned cutting machine or an autonomous cutting machine.

The operator, via the input station 306, or the controller responsive to an automatic routine, can command the reel rotating speed and direction of rotation to the reel motor 16. The controller can be signal-connected to a system 350 that controls the speed and direction of rotation of the reel motor 16 to adjust the speed and direction of rotation of the reel 12. When a hydraulic motor is used, the system 350 can include speed and direction of rotation control of a hydraulic pump 352 that drives the hydraulic motor and/or flow control of valving 354 that diverts hydraulic fluid away from the motor 16 to adjust speed and/or reverses hydraulic fluid flow to change direction of rotation of the motor 16. The controller 300 can adjust the speed of the reel 12 based on grass length or type of grass given operator or other input.

The operator, via the input station 306, or the controller responsive to an automatic routine, can command adjustment of the height-of-cut, say in mm, and can command the automatic adjustment of the reel-to-bedknife clearance. For adjusting the reel-to-bedknife gap as explained below, by operator or automatic initiation the controller can command the reel motor 16, such as via the system 350, to spin the reel 12 in a reverse direction before initiation of the adjustment procedure by the operator. The actuator pairs 30, 32; 202, 204 can be adjusted individually to set a desired lateral degree of either the height-of-cut level or the reel-to-bedknife clearance. A position signal S1 from each actuator read head 314 is communicated to the controller 300, and an appropriate drive signal S2 is sent to the stepper motor 266 of each actuator via appropriate signal conditioning and/or amplification to position rod end portions 274 with respect to the respective actuator body 30b, 202b of the actuators 30, 32, 202, 204.

The detector 320 (FIGS. 2 and 9) can be used to adjust the reel-to-bedknife clearance. The detector 320 can be of a variety of types, including an accelerometer or a sound detector. The detector 320 can be a sound detector such as a microphone, such as an EMKAY MR-3151 from Emkay Innovative Products of Itasca, Ill., U.S.A. The microphone can be potted in polyurethane for protection and to strain relieve associated signal wires. The detector 320 can be provided in close proximity to the bedknife 14. The detector 320, in the form of a microphone, may be embedded in the bedknife, or mounted near the bedknife so as to detect the contact of the reel to the bedknife during the adjustment methods.

The detector 320 is signal-connected to the controller 300. Advantageously, during an adjustment procedure, the reel 12 is spun backwards and the detector 320 detects and signals to the controller any contact or "clicking" between the reel blades of the rotating reel 12 and the bedknife 14. Preferably, two detectors 320, 320 are provided, one at each end wall 14b of the bedknife, although a single detector 320 could be used as well, located at a position where sound can be detected from contact of the reel blades at either end of the bedknife.

According to one method, wherein the noise produced by the reel is sensed by a microphone, or alternately by an accelerometer, the resulting vibration is analyzed to detect the presence or absence of contact.

The algorithm used to analyze the noise is designed to detect a particularly prominent resonance point in the sensed sound when the reel and bedknife are clicking. The resonance is detected by using a single frequency range power spectral density (psd) estimate of the signal power. The single range method calculates the psd at only a single narrow frequency range (or bin) of interest. Reducing the psd algorithm in this way significantly lessens the computational effort needed versus the full psd. This style of algorithm is used to reduce sensitivity to spurious environmental noise. The resonance can also be detected in using an analog or discrete switched capacitor narrow bandpass (or notch) filter, rectifying the filter output, and then detecting the DC level of the resulting signal.

Alternately, a simple algorithm that senses the increased noise level when the reel/bedknife are in contact can be used, but this algorithm can be sensitive to environmental noise.

Figure 13:
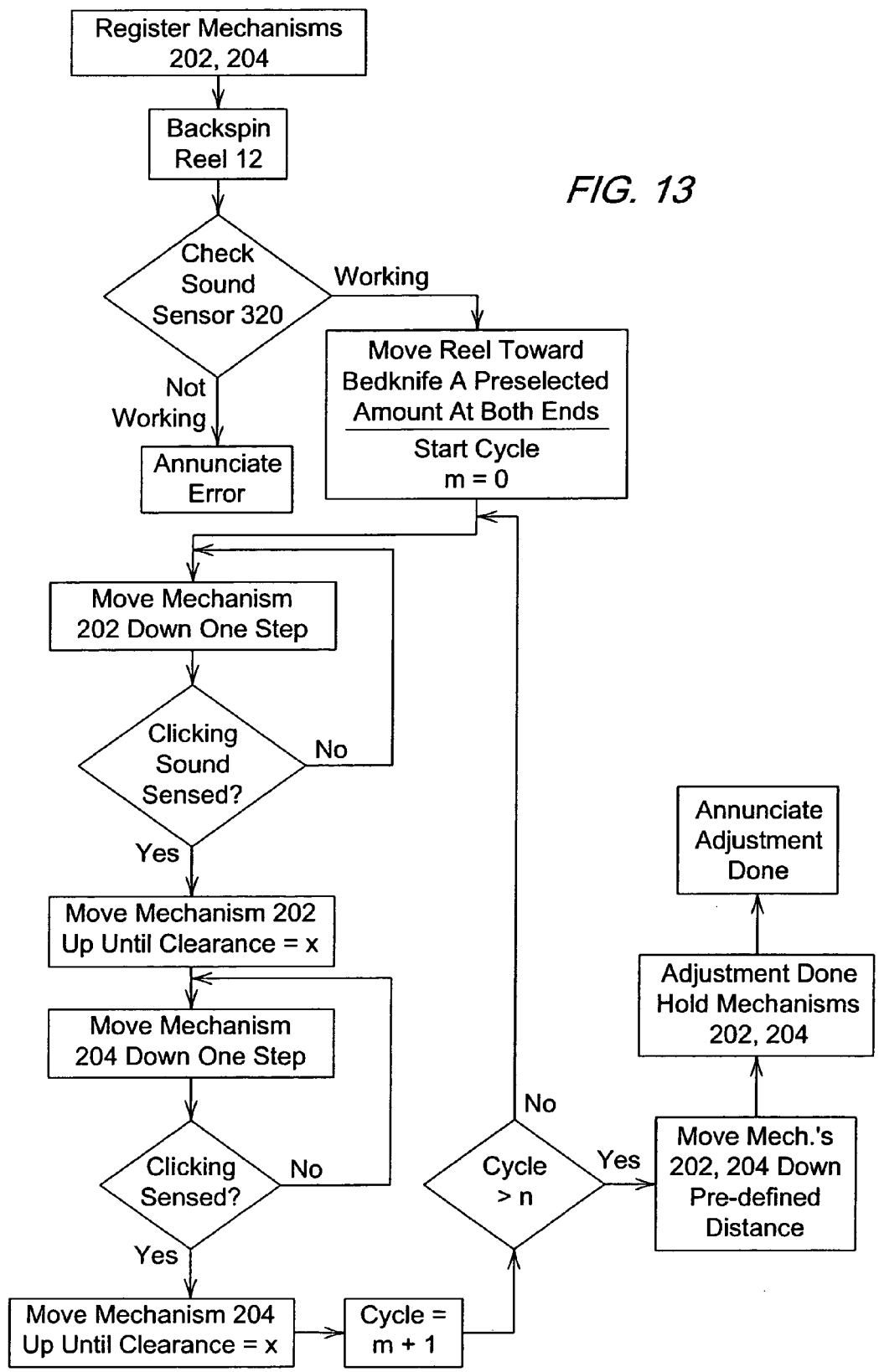
FIG. 13 is a schematic block diagram illustrating a method according to the present invention.

A method of precisely positioning the reel 12 with respect to the bedknife 14 using the sound detector(s) 320 is set forth in FIG. 13. The methods of the invention can all be automatically accomplished at the direction of the controller after initiation by an operator. Although the method as set forth below is described as being operator initiated, the method can also be initiated automatically during operation, initiated periodically by the controller or initiated by the sensing of reel-to-bedknife contact during operation, or initiated by a change in reel tasking, i.e., a new type of grass or length of grass to be cut. This change in reel tasking can be initiated by a remote signal or a sensed signal such as by a grass height sensor, or a ground-based or GPS based position signal.

The steps of one method of the invention comprise:

1. registering adjustment mechanisms 202,204 by moving the reel adjustment mechanisms 202, 204 to known positions, particularly, moving the rods 202c to known positions with respect to the bodies 202b using the drive motors 202a;

2. spinning the reel 12 in a reverse direction from the normal operating direction, normal operating direction being a counterclockwise direction as viewed in the right side view of FIG. 9, that is, during normal operation the bottom of the reel 12 spins toward the bedknife;

3. moving the reel 12 toward the bedknife 14 an equal pre-selected distance on both ends of the reel, particularly by using the drive motors 202a to move the rods 202c an equal pre-selected amount with respect to the bodies 202b;

4. moving the reel 12 toward the bedknife 14 on a first end of the reel by a continuous step or by incremental steps of the drive motor 202a of the actuator 202 until a contact between the reel and the bedknife is detected by the adjacent detector 320, particularly by using the drive motor 202a of the actuator 202 to extend the rod 202c with respect to the body 202b; the contact can be detected as a faint clicking sound detected by the detector 320 being in the form of a microphone;

5. moving the reel 12 on the first end of the reel away from the bedknife 14 to produce a clearance of a small pre-defined distance "y", where y>desired gap width, particularly by using the drive motor 202a of the actuator 202 to retract the rod 202c with respect to the body 202b;

6. moving the reel 12 toward the bedknife 14 on an opposite end of the reel by a continuous step or by incremental steps of the drive motor 202a of the actuator 204 until a contact between the reel and the bedknife, a faint clicking, is detected by the adjacent sound detector 320, particularly by using the drive motor 202a of the actuator 204 to extend the rod 202c with respect to the body 202b; the contact can be detected as a faint clicking sound detected by the detector 320 being in the form of a microphone;

7. moving the reel 12 on the opposite end of the reel away from the bedknife 14 to produce a clearance of the small pre-defined distance y, particularly by using the drive motor 202a of the actuator 204 to retract the rod 202c with respect to the body 202b; and 8. repeating the adjustment of steps 4 through 7 "n" times wherein "n" is experimentally pre-determined to be the minimum number of cycles that produces the accurate pre-defined distance y on both ends of the reel. Currently, it is anticipated that only a few cycles of steps 4 through 7, such as n=3, will be needed to produce an accurate pre-defined distance y on both ends of the reel. Alternately, the precise locations of the first reel end with respect to the bedknife, at positions before step 4 and after step 5, and the precise locations of the respective second reel end with respect to the bedknife, at positions before step 6 and after step 7, can be stored and compared until a consistent distance y between the reel and the bedknife is achieved at each reel end. The precise locations are provided by the encoders 310 of the actuators 202, 204 and sent to the controller.

9. after the accurate distance y is set at both ends of the reel, moving both ends of the reel toward the bedknife by the difference between the pre-defined distance y and the pre-selected gap width, (y minus gap width) to set the pre-selected gap width between the reel and the bedknife. By first accurately setting the pre-selected reel-to-bedknife clearance y as a penultimate setting, and then subsequently reducing this clearance to the smaller gap width, the detection accuracy of the method is enhanced because contact between the reel and bedknife during the click detection cycle is more likely to be limited to contact at the extreme ends of the reel. The resulting gap width between the reel and the bedknife can be in the range of, but not limited to, about 0.001 to 0.003 inches.

Other methods encompassed by the invention are possible. Method step 1 above can be eliminated. Method step 2 can be modified wherein the reel 12 is spun in the normal operating direction. Method step 3 can be modified wherein the reel 12 is moved away from the bedknife 14 a pre-selected distance on both ends of the reel. Method steps 5 and 7 can be modified wherein the small pre-defined distance y can be equal to the actual gap widt then be eliminated.

Furthermore, although the steps refer to moving the reel toward or away from the bedknife, this is to be interpreted as relative movement, such relative movement would also encompass moving the reel toward or away from a stationary bedknife, moving the bedknife toward or away from a stationary reel, or moving both reel and bedknife toward and away from each other.

Figure 14:
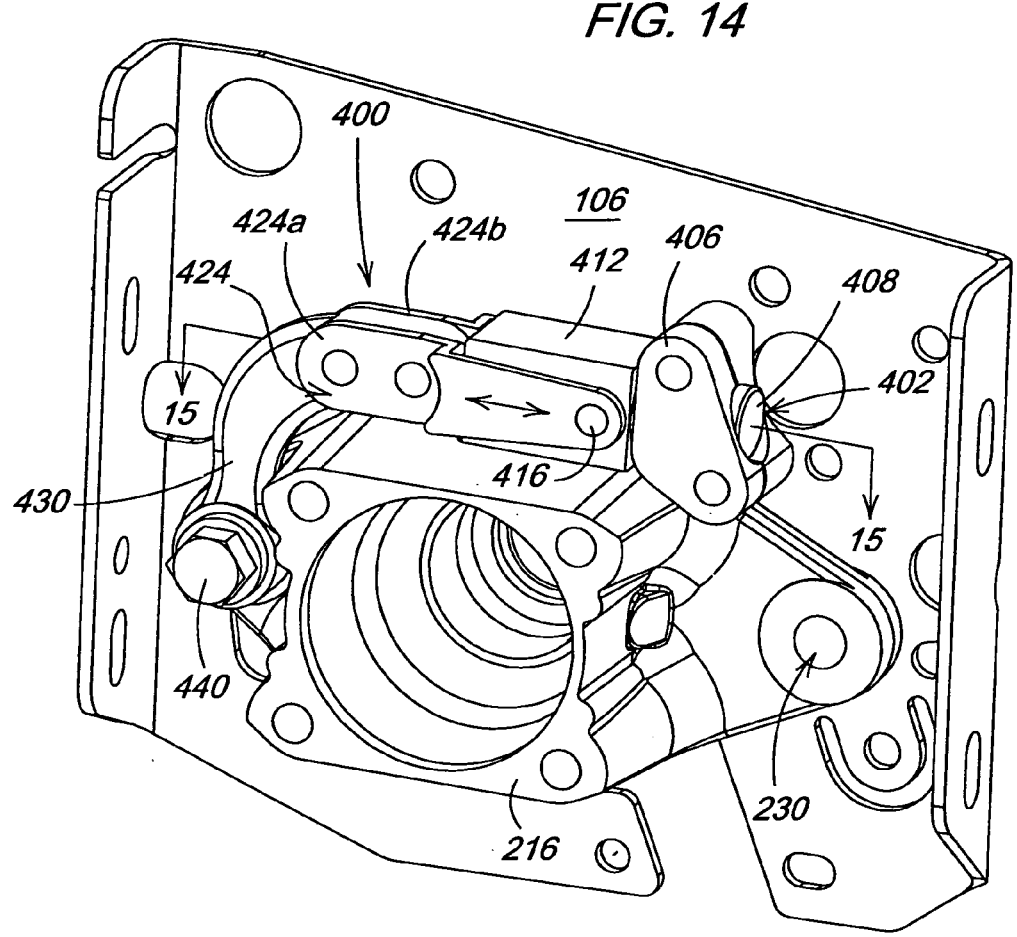
FIG. 14 is a fragmentary perspective view of an alternate embodiment with portions of the cutting unit removed for clarity of description.
Figure 15:
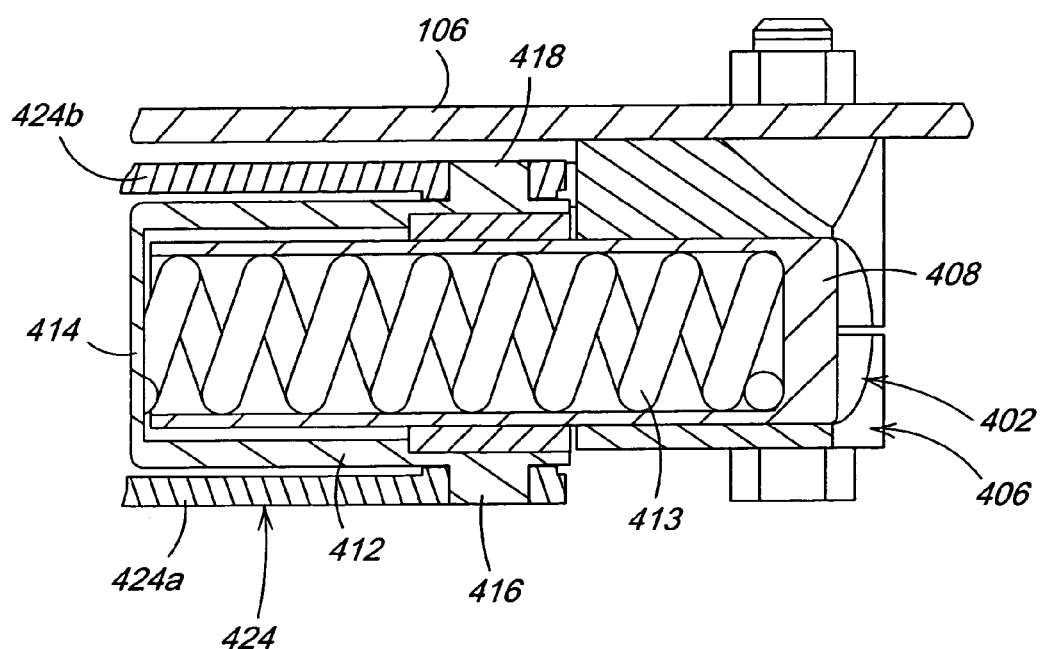
FIG. 15 is a sectional view taken generally along line 15—15 of FIG. 14.

FIGS. 14 and 15 illustrate an alternate embodiment spring assembly 400 to replace the spring 234 shown in FIG. 3 and the anti-backlash arrangement, including the anti-backlash nut 288 and spring 296 shown in FIGS. 5 and 6. The actuator 202 is not shown in FIG. 14 but would be attached to the housing 216 in similar fashion as that shown in FIGS. 3-7 and 10. The assembly 400 includes a hollow cylinder 402 fixed to the frame 106 by a clamp 406 fastened to the frame 106. The cylinder 402 has an end wall 408. The cylinder 402 extends horizontally into a blind bore 410 (FIG. 15) of a slider block 412. The cylinder 402 is open on an end within the blind bore 410. The coil spring 413 is captured within the bore 410, and braced against an end wall 414 of the bore and the end wall 408 of the cylinder. The slider block 412 has cylindrical pins or ears 416, 418 formed with or attached thereto, extending from opposite lateral sides of the slider block 412.

A yoke 424 formed by pieces 424a, 424b pivotally captures the pins 416, 418. The yoke 424 can pivot with respect to the slider block 412. The yoke 424 is fastened to an L-shaped arm 430. The L-shaped arm 430 is fastened by a bolt 440 to the reel bearing housing 216. The bolt 440 can be replaced by an attachment that also includes the ball joint 220 shown in FIGS. 3 and 4 to also attach the actuator 202 at the same location.

In operation, the coil spring 413 exerts a force (to the left) on the slider block 412 that exerts a resilient downward force on the bolt 440 and housing 216. Because of the geometry of the spring assembly 400, a substantially constant resilient force is exerted on the bolt 440 and housing 216 over a wide-angle of movement of the housing 216, pivoting about the connection 230. The force applied to the bolt 440 and housing 216 varies only a small amount even as the compression of the spring 413 varies by a larger amount.

The assembly 440 eliminates backlash in the actuator and play in the ball joint 220 allowing use of a less-precise actuator. Also, any impact loading on the reel can be largely absorbed by the spring, instead of by the actuator.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A control system for adjusting the reel of a cutting reel unit, comprising:
   a cutting reel;
   a frame supported on at least one support element that is supported on, and is movable along, the ground;
   at least one housing supporting said cutting reel, said housing movably mounted on said frame;
   a bedknife carried on said frame;
   an actuator having a first portion connected to the frame and a second portion connected to said housing, wherein relative positions of said first and second portions are adjustable to set a pre-selected clearance between said reel and said bedknife, and including a motive mechanism that is activated to adjust said relative positions; and
   a controller signal-connected to said motive mechanism to set said pre-selected clearance;
   comprising a precise position sensor, said precise position sensor signal-connected to said controller, said controller signal-connected to said motive mechanism to precisely adjust said relative positions based on a position signal from said sensor;
   wherein said motive mechanism comprises a stepper motor, and said sensor comprises an optical encoder having a read head signal-connected to said controller and an optical disk arranged to rotate with an output shaft of said stepper motor.

2. The control system according to claim 1, wherein said first and second portions are located in substantial vertical alignment on a front side of said frame.

3. The control system according to claim 1, comprising a spring mechanism arranged between said housing and said frame to bias relative movement between said first and second portions.

4. The control system according to claim 1, wherein said motive mechanism comprises a a drive screw mechanism driven by said stepper motor to linearly displace said first portion from said second portion.

5. The control system according to claim 4, wherein said drive screw mechanism comprises a lead screw rotated by said stepper motor, and a rod operatively connected to said cutting reel, said rod having a portion threaded to said lead screw, rotation of said lead screw causing translation of said rod with respect to said stepper motor.

6. The control system according to claim 1, wherein said reel is mounted to pivot with respect to said frame, a degree of pivoting of said reel dependent on said relative positions of said first and second portions, the degree of pivoting selling the pre-selected clearance between said reel and said bedknife.

7. The control system according to claim 6, wherein said at least one housing comprises two housings, each housing supportina one end of said reel on said frame, said housings being pivotable on said frame and comprising a further actuator. said actuator and said further actuator being connected between said frame and a respective one of said housings.

8. The control system according to claim 1, wherin said motive mechanism comprises a lead screw mechanism driven to extend or retract by said stepper motor and connected to at least one of said first and second portions.

9. The control system according to claim 8, wherein said first and second portions are located in substantial vertical alignment on a front side of said frame.

10. The control system according to claim 8, comprising a spring mechanism arranged between said housing and said frame to bias relative movement between said first and second portions.

11. The control system according to claim 1, comprising a further actuator, and wherein said at least one housing is one of two housings, one housing supporting each end of said reel, said housings carried on said frame, one of said actuator and said further actuator located at each end of said reel, and said actuator and said further actuator each having a first portion connected to the frame and a second portion connected to a respective one of said two housings, wherein relative positions of said first and second portions are adjustable, and each of said actuator and said further actuator includes one said motive mechanism that is activated to adjust said relative positions.

12. A control system for a cutting reel unit comprising:
   a first frame;
   a second frame:
   a cutting reel supported by said second frame;
   a bedknife arranged adjacent to said cutting reel and supported by said second frame;
   at least one support element arranged to translate along the ground and arranged to support said first frame;

at least one first actuator connected between said first frame and said second frame and arranged to adjust the relative elevation of said second frame with respect to said first frame;

at least one second actuator operatively connected between said reel and said bedknife and arranged to adjust the clearance between said reel and said bedknife; and a controller signal-connected to said first and second actuators and operable to adjust said first and second actuators to adjust the clearance between said reel and said bedknife and to adjust an elevation of said clearance between the reel and the bedknife above the ground.

13. The control system according to claim 12, wherein one of said first and second actuators comprises a stepper motor and a lead screw mechanism driven to extend or retract by said stepper motor and operatively connected to at least one of said reel and said bedknife.

14. The control system according to claim 12, wherein said at least one second actuator is one of two second actuators, and wherein said reel is supported on said second frame by two housings, one housing supporting each end of said reel, said housings movably carried on said second frame, one of said second actuators located at each end of said reel, and said second actuators each having a first portion connected to the second frame and a second portion connected to a respective one of said two housings, wherein relative positions of said first and second portions are adjustable, and powered motive mechanism that is activated to adjust said relative positions.

15. The control system according to claim 12, comprising a precise position sensor, said precise position sensor signal-connected to said controller, said controller signal-connected to said second actuator to precisely adjust said clearance between said reel and said bedknife based on a position signal from said sensor.

16. The control system according to claim 12, wherein said actuators each comprise a stepper motor operatively associated with a lead screw mechanism driven to extend or retract by said stepper motor.

17. The control system according to claim 12, further comprising position sensors that are signal-connected to said controller, said position sensors determining the elevation of said reel with respect to the at least one support element and determining the position of said reel with respect to said bedknife.

18. The control system according to claim 12 comprising a sound detector arranged in close proximity to said bedknife to detect touching between said cutting reel when spinning and said bedknife.

19. A control system for adjusting clearance between a cutting reel and a bedknife of a cutting reel unit, comprising:
a bedknife;
a frame fixed in position with respect to said bedknife;
a rotatable reel having cutting blades, said reel mounted to said frame and being adjustably movable toward and away from said bedknife;
a controller;
first and second actuators carried by said frame at opposite ends of said reel and each having a first portion fixed with respect to said frame and a second portion operatively connected to said reel, a motive portion signal-connected to said controller, relative positions of said first and second portions being adjustable by actuation of said motive portions by said controller to adjust clearance between said reel and said bedknife;

wherein each said motive portion comprises a stepper motor that drives a drive screw mechanism to linearly displace said first portion from said second portion; and wherein said drive screw mechanism comprises a lead screw rotated by said stepper motor, and a rod operatively connected to said cutting reel, said rod having a portion threaded to said lead screw, rotation of said lead screw causing translation of said rod with respect to said actuator; and wherein said actuator comprises an anti-backlash nut threaded on said lead screw, and a spring, said anti-backlash nut having a first surface abutting a second surface of said rod, said spring urging said anti-backlash nut in rotation around said lead screw such that thread play between said rod and said lead screw is removed.

20. The control system according to claim 19, wherein said first and second surfaces are conically shaped and nest together.

21. The control system according to claim 20, wherein said spring is attached at one end to said rod and at an opposite end to said anti-backlash nut.

22. A control system for a cutting reel unit comprising:
a first frame;
a second frame;
a cutting reel supported by said second frame;
a bedknife arranged adjacent to said cutting reel and supported by said second frame;
at least one support element arranged to translate along the ground and arranged to support said first frame;
at least one first actuator connected between said first frame and said second frame and arranged to adjust the relative elevation of said second frame with respect to said first frame;
at least one second actuator operatively connected between said reel and said bedknife and arranged to adjust the clearance between said reel and said bedknife;
a controller signal-connected to said first and second actuators; and
position sensors that are signal-connected to said controller, said position sensors determining the elevation of said reel with respect to the at least one support element and determining the position of said reel with respect to said bedknife, wherein said sensors comprise optical encoders.

23. A control system for adjusting clearance between a cutting reel and a bedknife of a cutting reel unit, comprising:
a bedknife;
a frame fixed in position with respect to said bedknife;
a rotatable reel having cutting blades, said reel mounted to said frame and being adjustably movable toward and away from said bedknife;
a controller;
first and second actuators carried by said frame at opposite ends of said reel and each having a first portion fixed with respect to said frame and a second portion operatively connected to said reel, and a motive portion signal-connected to said controller, relative positions of said first and second portions being adjustable by actuation of said motive portions by said controller to set a pre-selected clearance between said reel and said bedknife;

wherein said motive portion comprises a stepper motor that drives a drive screw mechanism to linearly displace said first portion from said second portion;

wherein each first and second actuator comprises a distance sensor that is signal-connected to said controller, wherein said controller drives said stepper motor in response to a distance signal from said distance sensor.

24. A control system for adjusting clearance between a cutting reel and a bedknife of a cutting reel unit, comprising:
- a bedknife;
- a frame fixed in position with respect to said bedknife;
- a rotatable reel having cutting blades, said reel mounted to said frame and being adjustably movable toward and away from said bedknife;
- a controller;
- first and second actuators carried by said frame at opposite ends of said reel and each having a first portion fixed with respect to said frame and a second portion operatively connected to said reel, a motive portion signal-connected to said controller, relative positions of said first and second portions being adjustable by actuation of said motive portions by said controller to adjust clearance between said reel and said bedknife, wherein said motive portion comprises a stepper motor that drives a drive screw mechanism to linearly displace said first portion from said second portion;
- wherein each first and second actuator comprises a distance sensor that is signal-connected to said controller, wherein said controller drives said stepper motor in response to a distance signal from said distance sensor, wherein said distance sensor comprises an encoder having a disc rotatable with said stepper motor, said disc having a marking, and a read head signal-connected to said controller and responsive to said marking on said disc.

25. A control system for adjusting the reel of a cutting reel unit, comprising:
- a cutting reel;
- a frame supported on at Least one support element that is supported on, and is movable along, the ground;
- at least one housing supporting said cutting reel, said housing movably mounted on said frame;
- a bedknife carried on said frame;
- at least one actuator having a first portion connected to the frame and a second portion connected to said housing, wherein relative positions of said first and second portions are adjustable to set a pre-selected clearance between said reel and said bedknife, and said actuator including a motive mechanism that is activated to adjust said relative positions;
- said motive mechanism including a precise positioning system that controls the actuation of said motive mechanism to automatically adjust said relative positions wherein said reel and said bedknife are set at said pre-selected clearance;
- a controller, said precise positioning system is signal-connected to said controller, said controller signal-connected to said actuator to precisely adjust said relative position based on a position signal from said precise positioning system;
- wherein said actuator comprises a stepper motor, and said precise positioning system comprises an optical encoder having a read head signal-connected to said controller and an optical disk arranged to rotate with an output shaft of said stepper motor.

* * * * *